Patented Apr. 23, 1946

2,398,825

UNITED STATES PATENT OFFICE 2,398,825

ACID ACTIVATED CLAY

Stanard R. Funsten, Pasadena, Calif., assignor to Filtrol Corporation, Los Angeles, Calif., a corporation of Delaware No Drawing. Application November 23, 1943, Serial No. 511,501

10 Claims. (Cl. 252—270)

Clays are activated commercially by treating with dilute acid for a period of time necessary to remove the desired amount of alumina from the clay. The process comprises contacting a sub-bentonite clay of the montmorillonite family with dilute sulphuric acid at concentrations from about 5 to 60%, for instance, about 15%, and employing acids in the amount of from 20 to 150 pounds of sulphuric acid (calculated as anhydrous) per 100 pounds of clay (calculated as volatile free), for instance, 30 pounds of $H_2SO_4$ per 100 pounds of clay. The temperature of the reaction is about 200° to 215° F. The time about six hours. This is sufficient to produce a clay having an $Al_2O_3$ content of from about 10% to 20%, for example, about 17%. The degree of extraction depends upon the activity desired and the use to which the clay is placed. The clay is then washed with water and separated from the acid by a series of decantation and washing steps in thickeners and settlers and finally filtered. The filtered clay is then dried to a moisture content of from 15% to 30% and ground to desired mesh size.

The clay has an acidity resulting from adsorbed sulphuric acid and aluminum sulfate. This acidity is determined by the so-called "boil-out" test, in which 5 grams of the clay are boiled with 50 cubic centimeters of distilled water, filtered, and the filter cake washed with 50 cubic centimeters of hot distilled water. The acidity is determined by titration, using phenolphthalein indicator. The acidity expressed in milligrams of KOH per gram of sample is termed "titratable" acidity.

Clays produced by the above procedure will contain an amount of acid varying from about 3 to 20 milligrams of KOH per gram of clay (i. e., a titratable acidity of 3 to 20), depending upon the amount of washing to which the clay has been exposed.

As usually produced, clays will have a titratable acidity of from 2 or less to about 4 milligrams of KOH. However, for many oils, clays of titratable acidity of from 6 to 20 milligrams of KOH are to be preferred. Such clays appear to exhibit higher adsorptive powers, requiring less clay to give a desired oil decolorization than does a clay of from 2 to 4 milligrams of KOH titratable acidity. The titratable acidity of the clay depends on the extent of washing employed, and by regulating the washing of the clays of titratable acidity from 0 to 20 or 30 milligrams of KOH per gram of clay may be obtained.

When such high acidity clays are employed in contact filtration of oils, in which process the commingled oil and clay are filtered at relatively high temperature, the clays appear to attack the filter cloths employed in filtering the oil and clay mixture. Thus, canvas filters may become burned and weakened. This results from the action of steam employed in blowing down the cake.

When such clays are employed in treatment of vegetable and fatty oils, such as cottonseed, soya bean, linseed, etc., there is a rise in the free fatty acid content of the oil, presumably as a result of the splitting of the glycerides.

I have found that these effects of the acid may be overcome by imparting reserve alkalinity to the clay. By "reserve alkalinity," I mean the presence of an alkaline reacting substance capable of reacting with acid, but will not react in substantial amount with acid of the clay until the clay is contacted with water.

I impart the reserve alkalinity by mixing dried comminuted clay with a dry comminuted alkaline reacting substance. The alkaline reacting substance does not attack the acid reacting substance of the clay until the clay and alkaline material is moistened, as, for instance, by the steam used in blowing the filter cake. This protecting alkalinity thus does not interfere with the function of the adsorbed acidity in activating the clay. The acidic material in the clay is unaltered by the alkaline material subsequent to or during mixing, in the absence of moisture. However, in the presence of moisture, the free acidity of the clay is neutralized. By this means corrosive acid attack on filtering cloths and other textiles or metallic apparatus is minimized.

I have also found that the presence of the alkaline reacting material will reduce the fat-splitting activity of the clay and will minimize the rise in free fatty acid content resulting from contact of the glyceride oils with the clay.

In producing my high acidity clay with reserve alkalinity, I prefer to employ a solid alkaline reacting material in dry comminuted form in contradistinction to a solution of the alkaline material, or alkaline material in the presence of moisture insufficient to ionize the alkaline component. Such a solution would result in the neutralization of the acidity and the conversion of the aluminum sulfate to aluminum hydrate, i. e., aluminum hydroxide. This would produce a low acidity clay. The alkaline material would also react with the clay by base exchange and thus convert the acid montmorillonite into the corresponding metal montmorillonite. Thus, if the clay is treated with a solution of NaOH, we would obtain a neutralized clay, and if sufficient NaOH is used, we would obtain a sodium montmorillonite. Such procedure will impair the decolorizing and clarifying efficiency of the clay.

I therefore desire to employ the alkaline-reacting component in dry comminuted form, preferably solid. By "dry," I mean substantial moisture, i. e., containing water in amount insufficient to cause a reaction between the alkaline material and the clay on mixing. I may use lime or hydrated lime, magnesium oxide or dolomitic lime (about ⅔ hydrated lime, ⅓ MgO), calcium carbonate, magnesium carbonate, trisodium phosphate, sodium silicate, sodium and potassium carbonate or bicarbonate, or other solid alkaline-reacting components.

I have also found it desirable to incorporate the reserve alkalinity by mixing the relatively dry alkaline-reacting compound with the clay when the clay is dried to a moisture content of less than 40%, and preferably to a moisture content of about 10 to 30%. By "moisture content" is meant the loss on ignition to about 1700° F. for thirty minutes. A convenient way of adding this material is to mix the dried clay with the alkaline material in a pug mill.

I desire to add the comminuted alkaline reacting substance in an amount to cause a substantial reduction in the titratable acidity of the clay. Thus, I may add enough of such alkaline reacting material to cause a reduction in the titratable acidity of the clay in an amount equal to from about 1 to 20 milligrams of KOH per gram of such clay. Thus, I may acid treat the clay to produce a clay of titratable acidity of from about 2 or 3 milligrams KOH per gram of clay up to, for example, about 20 milligrams of KOH per gram of clay. I may add enough of the alkaline material to yield a clay of lower titratable acidity, i. e., from 0 to less than 20 milligrams of KOH per gram of clay; that is, the reduction in the titratable acidity by the addition of the reserve alkalinity may be equal to from say 1 to 20 milligrams of KOH per gram of clay. Thus, for example, I may produce an acid activated clay of high titratable acidity of from about 10 to 20 milligrams of KOH per gram of clay and add sufficient comminuted alkaline reacting material to the dried comminuted clay to produce a clay of titratable acidity equal to about 6 or less milligrams of KOH per gram of clay. Or, as a further example, I may produce a clay of intermediate titratable acidity, i. e., from 5 to 10 milligrams of KOH per gram of clay, and add sufficient reserve alkalinity to produce a clay of lower titratable acidity, i. e., about 0 to 5 or 6 milligrams of KOH per gram of clay. For example, I may acid treat a clay to produce a clay of about 15% to 17% $R_2O_3$ and wash the clay to a titratable acidity of about 10 to 15 milligrams of KOH and then add sufficient alkaline-reacting component to give a clay of from 3 to 6 milligrams of KOH titratable acidity.

The following examples are intended to illustrate but not to limit my invention:

A clay was activated by treatment with a sulfuric acid solution of about 21% concentration, employing an amount of acid which, when calculated as anhydrous $H_2SO_4$, equaled 50% of the clay when calculated on a volatile free basis. The clay was treated for a period of six hours. The clay was then washed, and dried to a moisture content of about 20%. This clay had a titratable acidity of 12.9 milligrams of KOH. The clay was then blended with dry hydrated lime in an amount equal to about 2% of the clay. The resulting clay mixture had a titratable acidity of 3.2 milligrams of KOH. The clay-lime mixture had as high a decolorizing efficiency as the clay of 12.9 milligrams of KOH titratable acidity and showed a higher press rate.

Instead of employing the lime, the above clay was mixed with 2% $CaCO_3$. The titratable acidity of the mixture was 3.1 milligrams KOH. This clay-calcium-carbonate mixture showed a comparable decolorizing efficiency and an even higher press rate, being 20% greater than the high acidity clay.

In both of the previous cases the clay to which the alkaline-reacting compound was added showed a marked reduction in the generation of free fatty acid when employed as a decolorizing agent for glyceride oils. The free fatty acid increase obtained in using the high acidity clay with the reserve alkalinity, as described above, was less than the increase obtained when using the same clay having a high acidity, i. e., without the lime or calcium carbonate.

The increase in press rate, i. e., the rate of filtration of the oil and clay after contacting for decolorization, is important not only in that it increases the efficiency of filtration but also diminishes the loss of oil to the clay cake.

While I have described a particular embodiment of my invention for the purpose of illustration, it should be understood that various modifications and adaptations thereof may be made within the spirit of the invention as set forth in the appended claims.

I claim:

1. An acid treated adsorbent clay of titratable acidity of about 20 or less milligrams KOH per gram of clay containing a reserve alkalinity, which comprises a dry un-neutralized acid activated adsorbent clay of titratable acidity higher than said first mentioned titratable acidity mixed with a dry alkaline reacting material.

2. An acid treated adsorbent clay of titratable acidity of about 20 or less milligrams KOH per gram of clay containing a reserve alkalinity, which comprises a dry un-neutralized acid activated adsorbent clay of titratable acidity higher than said first mentioned titratable acidity mixed with a dry hydrated lime.

3. An acid treated adsorbent clay of titratable acidity of about 20 or less milligrams KOH per gram of clay containing a reserve alkalinity, which comprises an un-neutralized acid treated adsorbent clay component of titratable acidity of from about 10 to about 20 milligrams KOH per gram of clay and higher than said first mentioned titratable acidity mixed with an amount of dry alkaline-reacting material to give sufficient reserve alkalinity to yield a clay of titratable acidity of about 20 or less milligrams of KOH per gram of clay.

4. An acid treated adsorbent clay of titratable acidity of about 20 or less milligrams KOH per gram of clay containing a reserve alkalinity, which comprises an un-neutralized acid treated adsorbent clay component of titratable acidity of from about 10 to about 20 milligrams KOH per gram of clay, and higher than said first mentioned titratable acidity, mixed with an amount of dry hydrated lime to give sufficient reserve alkalinity to yield a clay of titratable acidity of about 20 or less milligrams of KOH per gram of clay.

5. An un-neutralized acid treated activated clay in dry comminuted form mixed with a relatively dry solid comminuted alkaline-reacting component.

6. An un-neutralized acid treated activated clay in dry comminuted form mixed with a relatively dry solid comminuted hydrated lime.

7. An acid treated activated clay of titratable acidity of about 6 or less milligrams of KOH per gram of clay, which comprises an un-neutralized acid treated clay component of titratable acidity of about 10 to above 20 milligrams of KOH per gram of clay mixed with a dry alkaline-reacting component sufficient to yield a titratable acidity of about 6 or less milligrams of KOH per gram of clay.

8. An un-neutralized acid treated activated clay of titratable acidity of about 6 or less milligrams of KOH per gram of clay, which comprises an acid treated clay component of titratable acidity of about 10 to about 20 milligrams of KOH per gram of clay mixed with dry hydrated lime sufficient to yield a titratable acidity of about 6 or less milligrams of KOH per gram of clay.

9. An un-neutralized acid treated activated clay of titratable acidity of about 0 to about 6 milligrams of KOH per gram of clay, which comprises an acid treated clay component of titratable acidity of about 5 to 10 milligrams of KOH per gram of clay and higher than said first mentioned titratable acidity, mixed with a dry alkaline-reacting component sufficient to yield a titratable acidity of about 0 to about 6 milligrams of KOH per gram of clay.

10. An un-neutralized acid treated activated clay of titratable acidity of about 0 to about 6 milligrams of KOH per gram of clay, which comprises an acid treated clay component of titratable acidity of about 5 to 10 milligrams of KOH per gram of clay and higher than said first mentioned titratable acidity, mixed with a dry hydrated lime sufficient to yield a titratable acidity of about 0 to about 6 milligrams of KOH per gram of clay.

STANARD R. FUNSTEN.